No. 761,966.

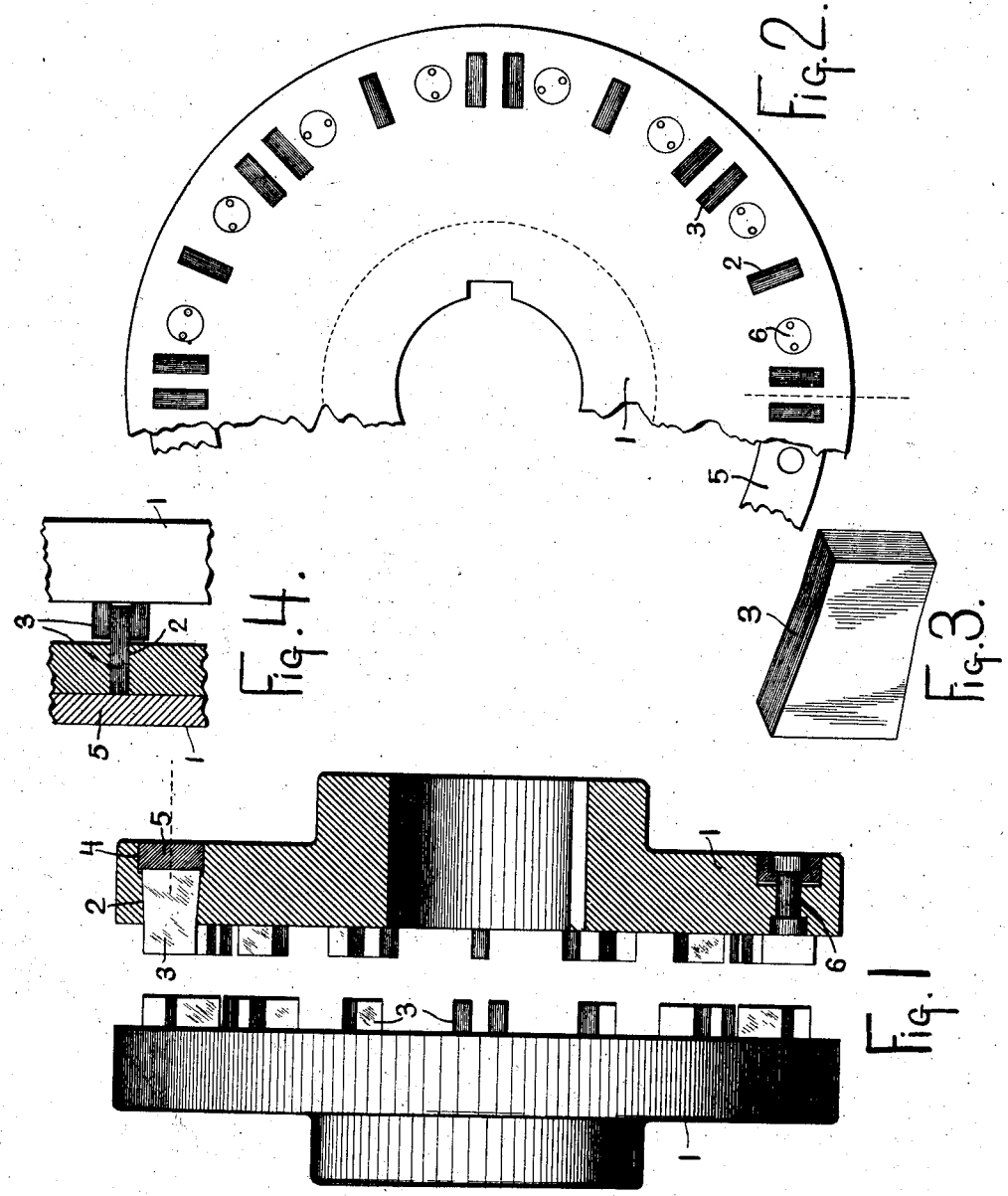

Patented June 7, 1904.

UNITED STATES PATENT OFFICE.

HANS HOLZWARTH, OF HAMILTON, OHIO, ASSIGNOR TO THE HOOVEN, OWENS, RENTSCHLER COMPANY, OF HAMILTON, OHIO.

COUPLING FOR SHAFTING.

SPECIFICATION forming part of Letters Patent No. 761,966, dated June 7, 1904.

Application filed March 14, 1904. Serial No. 197,980. (No model.)

*To all whom it may concern:*

Be it known that I, HANS HOLZWARTH, a citizen of Germany, residing in Hamilton, Butler county, Ohio, (post-office address, Hamilton, Ohio,) have invented certain new and useful Improvements in Couplings for Shafting, of which the following is a specification.

This invention, pertaining to couplings for shafting, will be readily understood from the following description, taken in connection with the accompanying drawings, in which—

Figure 1 is an edge view of a coupling exemplifying my present invention, the two coupling members being shown separated for clearness of view, one of the members being shown in elevation and the other in diametrical section; Fig. 2, an elevation of the inner face of one of the coupling members, part being broken away; Fig. 3, a perspective view, on an enlarged scale, of one of the laminated teeth; and Fig. 4, a plan, part section, showing a set of the intermembering teeth in engagement.

In the drawings, 1 indicates a disk adapted to be rigidly secured to the end of a shaft after the manner of an ordinary flange-coupling, such a disk being provided for each of the two shafts to be coupled, the two being identical, wherefore the description may be confined to a single one of the disks and its accessories; 2, a circular series of mortises extending through the disk concentric with its axis, these mortises being rectangular in contour and, considering their dimensions in the radial direction, tapering, the walls converging toward the inner face of the disk; 3, a laminated tooth or brush seated in each mortise and projecting inwardly from the face of the coupling, the tooth being formed of a number of layers of sheet metal of such form that the heel of the tooth, which is inserted from the outside end of the mortise, will fit and fill the mortise when tightly driven thereinto; 4, an annular groove in the outer face of the disk comprehending the outer ends of all of the mortises in the disk; 5, a keeper-ring disposed in the groove and bearing against the heel ends of all of the teeth in the disk, and 6 bolts through the disk and keeper-ring and holding the latter firmly in place. The mortises are preferably arranged as alternating units and pairs—that is to say, first a single mortise, then a pair of mortises, then another single mortise, and so on—and the distance between the mortises of a pair is equal to the pile of laminæ forming a tooth, and the spacing of the mortises is such that when the two members of the coupling are assembled each single tooth of one coupling member will be straddled by a pair of teeth of the other coupling member. The transmission of power between the coupling members is obviously on the same principle as any ordinary toothed or jawed coupling; but in the present construction the laminary construction of the teeth brings about a peculiarly advantageous action. Notwithstanding each tooth, considered as a whole, is firmly held in the disk and constitutes a very substantial driving agent, the projecting portions of the individual laminæ have certain capacity for bending to a slight degree, the transmission thus being in a measure similar to transmission through a series of brushes. The flexible capacity due to the laminary construction permits quite satisfactory transmission of power through the coupling even if the two shafts connected by it are either somewhat eccentric or out of line with each other, and as the ends of the teeth stand clear of the face of the opposite disk a reasonable amount of relative endwise play of the shafts or of the teeth relative to each other is provided for. The teeth cannot become displaced inwardly on account of their taper fitting, and they cannot become displaced outwardly on account of the keeper-ring. The bolts securing the keeper-ring are preferably constructed, as shown, with cylindrical heads and nuts fitting flush in circular counterbores, as by this means the air-resistance at high speed and the resulting noise are lessened.

While this coupling is suited for general transmission purposes, it will be found of special utility in connection with steam-turbines and similar work involving the transmission of large powers at very high speed and where a certain degree of flexibility along with noiselessness is desired. In the case of electric generators driven by compound steam-turbines the present coupling not only provides for defective and varying alinement of the several shafts, but it also provides for the independent endwise adjustment of the shafts.

The laminæ may, for instance, be of sheet metal.

I claim as my invention—

1. In a coupling, the combination, substantially as set forth, of a pair of disks, and flexible teeth projecting from the face of each disk, the teeth of one disk coming between those of the other disk.

2. In a coupling, the combination, substantially as set forth, of a pair of disks, and flexible laminated teeth projecting from the face of each disk, the teeth of one disk coming between those of the other disk.

3. In a coupling, the combination, substantially as set forth, of a pair of disks, and a circular series of flexible teeth projecting from the face of each disk, the teeth of one disk coming between those of the other disk.

4. In a coupling, the combination, substantially as set forth, of a pair of disks, a circular series of flexible teeth projecting from the face of each disk, the teeth in said series being arranged in alternating units and pairs so spaced that the unit teeth of one disk will be straddled by a pair of teeth of the other disk.

5. In a coupling, the combination, substantially as set forth, of a pair of disks, a circular series of laminated flexible teeth projecting from the face of each disk, the teeth in said series being arranged in alternating units and pairs so spaced that the unit teeth of one disk will be straddled by a pair of teeth of the other disk.

6. In a coupling, the combination, substantially as set forth, of a disk provided with a circular series of tapering mortises through it, and laminated teeth having tapering heels tightly fitting said mortises and having portions projecting from the face of the disk.

7. In a coupling, the combination, substantially as set forth, of a disk provided with a circular series of mortises, a tooth disposed in each mortise and having a portion projecting from the face of the disk and having an enlarged heel, and a keeper-ring secured at the rear of the disk and engaging the heel ends of the teeth.

8. In a coupling, the combination, substantially as set forth, of a disk provided with a circular series of tapering mortises, a tooth disposed in each mortise and having a portion projecting from the face of the disk and having a tapering heel fitting the mortise, and a keeper-ring secured at the rear of the disk and engaging the heel ends of the teeth.

9. In a coupling, the combination, substantially as set forth, of a disk provided with a circular series of mortises and provided with a circular groove in its rear face and comprehending the heel ends of the mortises, a tooth disposed in each mortise and having a portion projecting from the face of the disk and having an enlarged heel, and a keeper-ring secured in said groove and engaging the heel ends of the teeth.

10. In a coupling, the combination, substantially as set forth, of a disk provided with a circular series of mortises, a tooth disposed in each mortise and having a portion projecting from the face of the disk and having an enlarged heel, a keeper-ring disposed at the rear of the disk and engaging the heel ends of the teeth, and bolts securing the keeper-ring to the disk and having their heads and nuts flush with the ring and disk-surfaces which they respectively engage.

11. In a coupling, the combination, substantially as set forth, of a disk provided with a circular series of tapering mortises enlarging toward the rear of the disk and provided in its rear with a circular groove comprehending the heel ends of the mortises, a tooth disposed in each mortise and having a portion projecting from the face of the disk and formed of laminations, and a keeper-ring secured in the groove and engaging the heel ends of the disk.

HANS HOLZWARTH.

Witnesses:
SAM D. FITTON, Jr.,
ELMER R. SHIPLEY.